United States Patent [19]

Krueger

[11] Patent Number: 5,598,540
[45] Date of Patent: Jan. 28, 1997

[54] MEMORY MODULE INCLUDING READ-WRITE MEMORY AND READ-ONLY CONFIGURATION MEMORY ACCESSED ONLY SEQUENTIALLY AND COMPUTER SYSTEM USING AT LEAST ONE SUCH MODULE

[75] Inventor: Steven D. Krueger, Houston, Tex.

[73] Assignee: Texas Instruments Incorporated, Dallas, Tex.

[21] Appl. No.: 475,244

[22] Filed: Jun. 7, 1995

Related U.S. Application Data

[63] Continuation of Ser. No. 954,631, Sep. 30, 1992.

[51] Int. Cl.$^6$ ........................................... G06F 1/22
[52] U.S. Cl. .................... 395/284; 395/401; 395/497.01
[58] Field of Search ........................................ 395/497.01

[56] References Cited

U.S. PATENT DOCUMENTS

| | | | |
|---|---|---|---|
| 4,191,996 | 3/1980 | Chesley | 395/183.06 |
| 4,281,392 | 7/1981 | Grants et al. | 395/497.03 |
| 4,403,303 | 9/1983 | Howes | 395/500 |
| 4,468,729 | 8/1984 | Schwartz | 395/497.03 |
| 4,507,730 | 3/1985 | Johnson et al. | 395/497.01 |
| 4,787,060 | 11/1988 | Boudreau et al. | 395/497.03 |
| 4,951,248 | 8/1990 | Lynch | 395/402 |
| 5,027,313 | 6/1991 | Culley | 395/497.03 |
| 5,175,836 | 12/1992 | Morgan | 395/497.03 |
| 5,317,723 | 5/1994 | Heap et al. | 395/500 |

FOREIGN PATENT DOCUMENTS 2226666  4/1990  United Kingdom .

OTHER PUBLICATIONS

Texas Instruments; "MOS Memory Data Book", pp. 5–31 to 5–33, pp. 6–3 to 6–15, 1989.

*Primary Examiner*—Krisna Lim
*Attorney, Agent, or Firm*—Robert D. Marshall, Jr.; James C. Kesterson; Richard L. Donaldson

[57] ABSTRACT

A computer includes a processor for processing data, and memory modules for storing the data. Each memory module includes a read-write memory and a configuration memory. The configuration memory (i) contains memory module characteristic information, (ii) is adapted for storing a sequence of binary data values, accessing the stored binary data only in sequential order, and only at the first data value or the next data value, and (iii) has a NEXT signal pin. The configuration memory is adapted for receiving at the NEXT signal pin, and responding to, a $\overline{CAS}$ signal used by standard DRAMs. In other features of the invention, the memory module characteristic information includes an identification code for the manufacturer of the memory module, a part number for the memory module, the depth of the memory, access times to read full and page, and delay times to read and write full and page.

30 Claims, 6 Drawing Sheets

MEMORY MODULE INCLUDING READ-WRITE MEMORY AND READ-ONLY CONFIGURATION MEMORY ACCESSED ONLY SEQUENTIALLY AND COMPUTER SYSTEM USING AT LEAST ONE SUCH MODULE

This is a continuation of application Ser. No. 07/954,631 filed Sep. 30, 1992.

TECHNICAL FIELD OF THE INVENTION

This invention relates to personal computers, and more particularly to the random access memory (RAM) in personal computers.

BACKGROUND OF THE INVENTION

Memory modules allow easy upgrades of computer systems by relatively untrained personnel. However, installation of the memory modules themselves is only a portion of the upgrade task. Often a number of system parameters must be altered as well. Upgrading often involves changing jumpers, switches, or other indicators so that the computer system correctly recognizes the newly installed memory. This additional setting of indicators is frequently the source of errors when the memory is installed by untrained personnel. Additionally, the number of parameters which need to be configured has increased as the system memory controllers attempt to use memory modules in more sophisticated ways to extract the highest performance from the memory module. Changing up to 20 parameters is not likely to be successful, even for trained personnel.

One solution to this problem is self-identification of a memory board, such as that disclosed in UK Patent Application 2,226,667A. In that application a decoder electrically coupled with memory slots and with the central processing unit receives at the time the computer system is first powered on memory size identifying information from each of the memory boards coupled with the slots. The decoder assigns system address space to each of the individual memories. UK Patent Application 2,226,666A discloses a request/response protocol, in which a processor asserts a request signal onto a system bus. A memory module corresponding to the address of the request responds with information regarding the module's characteristics. Those characteristics include whether the module can communicate in a deterministic mode, memory size, memory speed, memory type, and whether the memory is cachable to a processor.

U.S. Pat. No. 4,589,063 to Shah et al. discloses a method and apparatus for automatic configuration of a computer system. The Shah et al. system is similarly limited to self-identification of an input/output device. The patent gives examples of such input/output devices, such as graphics controllers, analog-to-digital interfaces, and computer network interface equipment.

These identification solutions do not help the user who wishes to add some RAM, less than a full board, to his computer. What is needed is self-identification for individual memory modules, rather than identification of just an entire board of devices.

SUMMARY OF THE INVENTION

A computer includes a processor for processing data, memory modules for storing the data, first communication lines coupling the processor and the memory modules, for communicating the data between the processor and the memory modules and for communicating the memory module characteristic information from the modules to the processor, and second communication lines coupling the processor and the memory modules, for use by the processor to request the memory module characteristic information from the modules. Each module includes a read-write memory and a read-only memory. The read-only memory contains memory module characteristic information. Each module is connected to only two second communication lines. In other features of the invention, the memory module characteristic information includes an identification code for the manufacturer of the memory module, a part number for the memory module, the depth of the memory, access times to read full and page, and delay times to read and write full and page.

BRIEF DESCRIPTION OF THE DRAWINGS

The above-noted and other aspects of the present invention will become more apparent from a description of the preferred embodiment when read in conjunction with the accompanying drawings. The drawings illustrate the preferred embodiment of the invention. In the drawings the same members have the same reference numerals.

DETAILED DESCRIPTION OF THE INVENTION

Figure 1:
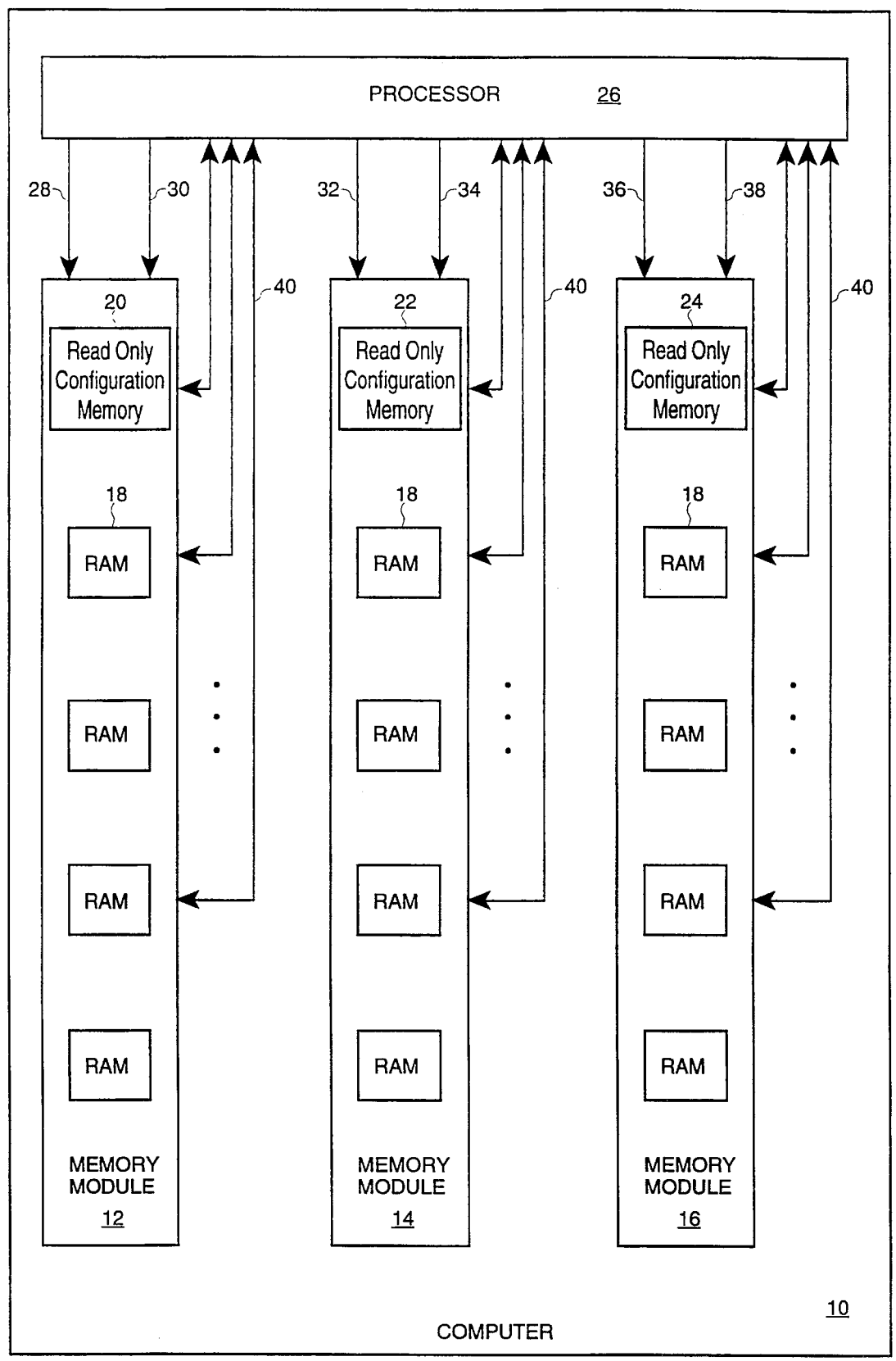
FIG. 1 depicts in a block diagram a computer built according to the present invention, containing three self-identifying memory modules.

FIG. 1 depicts a computer 10 built according to the present invention. The computer 10 has three memory modules 12, 14, and 16. Each memory module has four random access memories (RAM) 18. The memory modules 12, 14, and 16 also have read-only configuration memories (ROCM) 20, 22, and 24 respectively. Each ROCM could also be a ROM, a PROM, an EPROM, an EEPROM, or any other memory device that can not be modified merely by commands from the computer 10. Each ROM stores the self-identification information for its respective module, also known as the memory module characteristic information. The memory module 12 is coupled to a processor 26 by two communication lines 28, 30. The memory module 14 is coupled to the processor 26 by two communication lines 32, 34. The memory module 16 is coupled to the processor 26 by two communication lines 36, 38. The processor requests self-identification information from memory module 12 via lines 28, 30, from memory module 14 via lines 32, 34, and from memory module 16 via lines 36, 38. In the preferred embodiment, lines 30, 34, and 38 are just one line, which carries a $\overline{\text{CONFIG}}$ signal from the processor to each module. Communication lines 40 also couple the modules to the processor. The communication lines 40 carry data between the modules and the processor, and carry the memory module characteristic information from each module to the processor.

Figure 2:
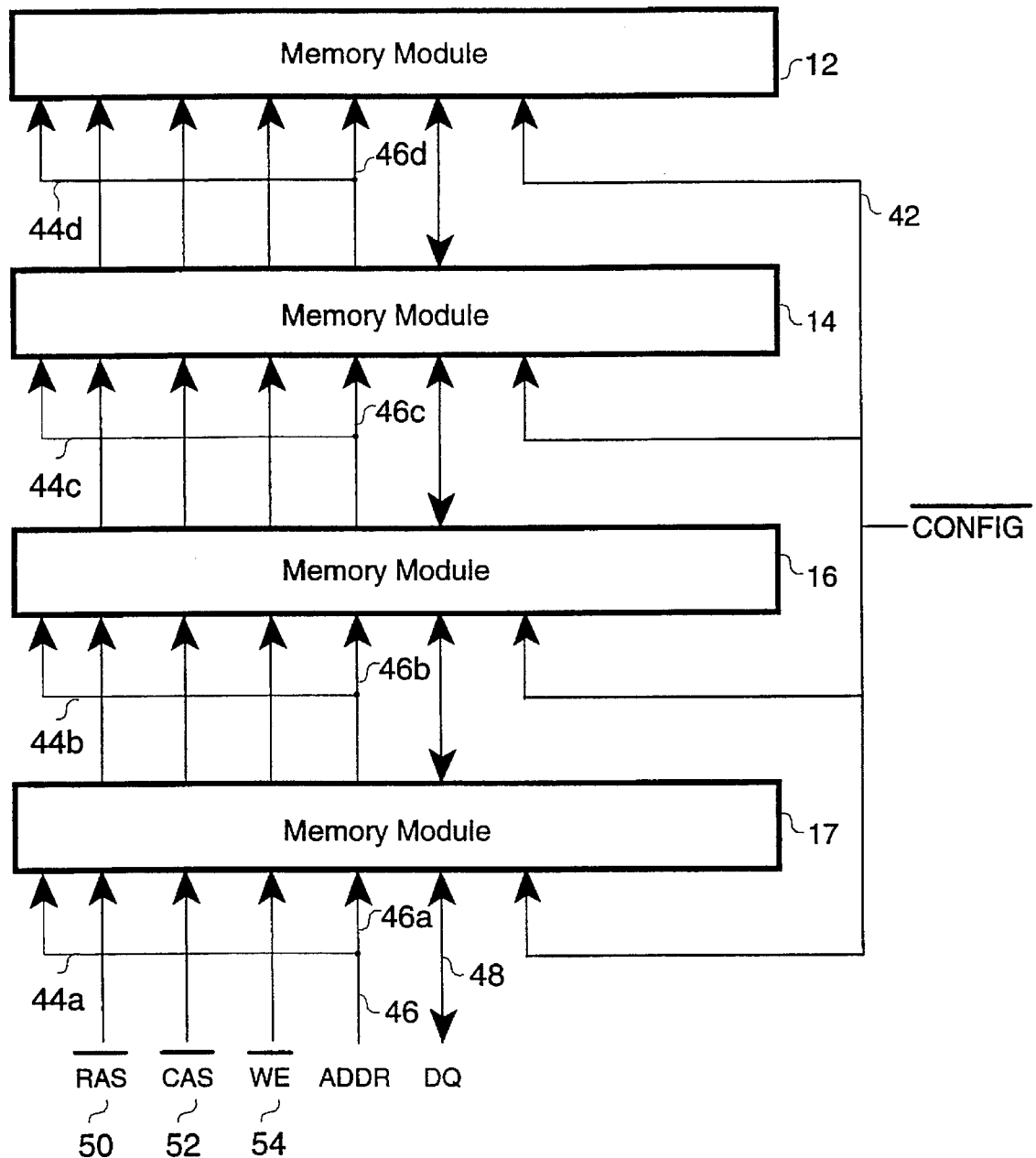
FIG. 2 is a block diagram of four self-identifying memory modules built according to the present invention.
Figure 3:
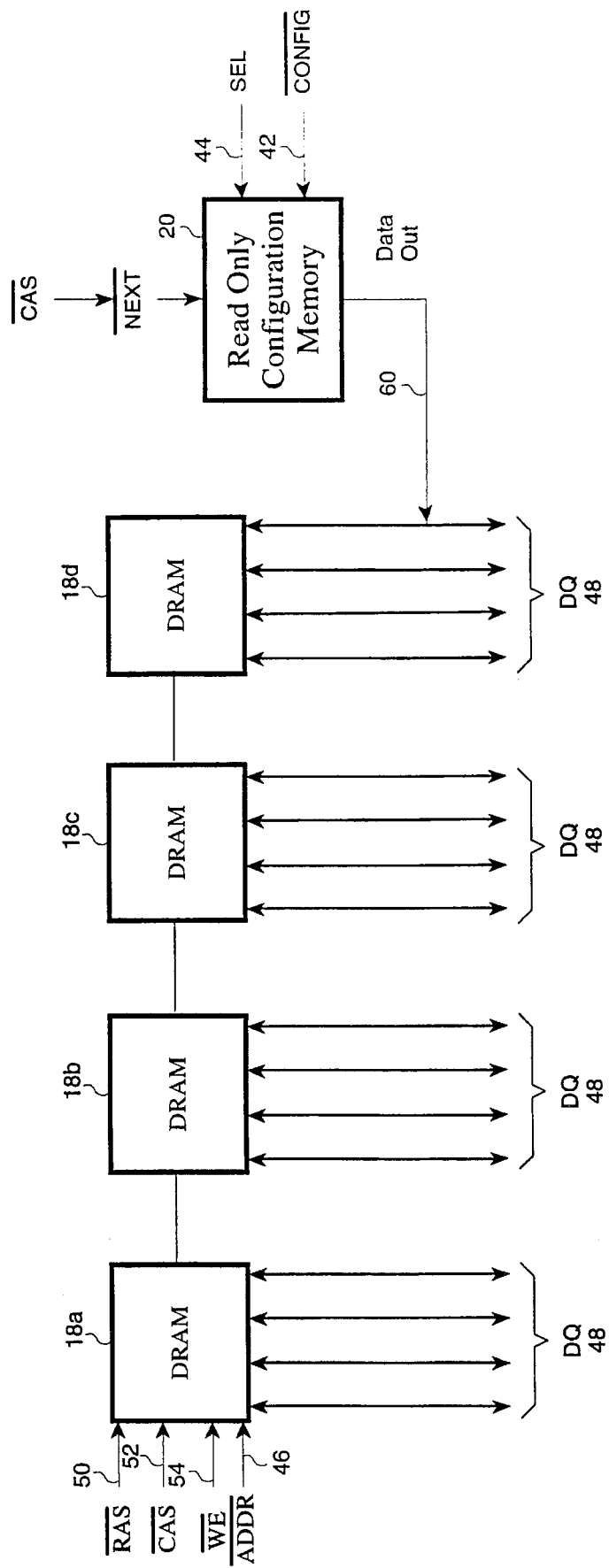
FIG. 3 is a block diagram of one self-identifying memory module built according to the present invention.

FIG. 2 depicts four self-identifying memory modules 12, 14, 16, and 17, built according to the present invention. The $\overline{\text{CONFIG}}$ signal is carried on a line 42 which connects to all four modules. A select ("SEL") signal is carried on SEL lines 44, each of which connects an address ("ADDR") line 46 to a memory module. Thus, for example, the SEL signal is carried on line 44a from lines 46 to memory module 17. The line 46 in FIGS. 2 and 3 represents multiple ADDR signal lines. Thus, each memory module is connected to a different ADDR line, 46a, 46b, 46c, and 46d. The SEL signal lines 44 serve the function of lines 28, 32, and 36 in FIG. 1. The SEL signal is used to select only one of the memory modules to respond with configuration information. The ADDR lines 46 connect to all four modules and carry address signals "ADDR" used for the row and column addresses of DRAM locations for normal, non-configuration access. Data in ("D"), data out ("Q") lines DQ 48 connect to all four modules and carry data into and out of each module. The DQ line 48 in FIGS. 2 and 3 represents multiple DQ signal lines. A row access strobe ("$\overline{\text{RAS}}$") signal line 50 and a column access strobe ("$\overline{\text{CAS}}$") signal line 52 connect to each module. The RAS and CAS signals mark the row and column addresses as with standard DRAMs. A write enable line ("$\overline{\text{WE}}$") line 54 connects to all four modules and carries the signal WE, which is used, as in standard, normal DRAMs, to mark when an access to a DRAM is a "write", instead of a "read".

The $\overline{\text{CONFIG}}$ and SEL signals work together to request self-identification information individually from each module, as shown below in Table 1.

TABLE 1

| $\overline{\text{CONFIG}}$ | SEL 44a | SEL 44b | SEL 44c | SEL 44d | MODULE SELECTED |
|---|---|---|---|---|---|
| High Level Signal | X | X | X | X | NONE |
| Low Level Signal | 0 | 0 | 0 | 0 | NONE |
| Low Level Signal | 0 | 0 | 0 | 1 | 12 |
| Low Level Signal | 0 | 0 | 1 | 0 | 14 |
| Low Level Signal | 0 | 1 | 0 | 0 | 16 |
| Low Level Signal | 1 | 0 | 0 | 0 | 17 |
| Low Level Signal | X | X | 1 | 1 | INVALID |

Where X is either zero or one, and the bottom row is only one example of an invalid combination of SEL signals, because such combination would select more than one module.

TABLE 1

FIG. 3 is a block diagram of the self-identifying memory module 12 built according to the present invention. The module 12 includes four DRAM's 18. Each DRAM 18 is connected to four data in, data out (DQ) lines 48. The DRAM 18a is also connected to the $\overline{\text{RAS}}$ 50, $\overline{\text{CAS}}$ 52, $\overline{\text{WE}}$ 54, and ADDR 46 lines. One of the DQ lines 48 connected to the DRAM 18d is also connected to a data out line 60 of the ROCM 20. The SEL signal and the inversion of the $\overline{\text{CONFIG}}$ signal are connected to the ROCM 20.

Figure 4:
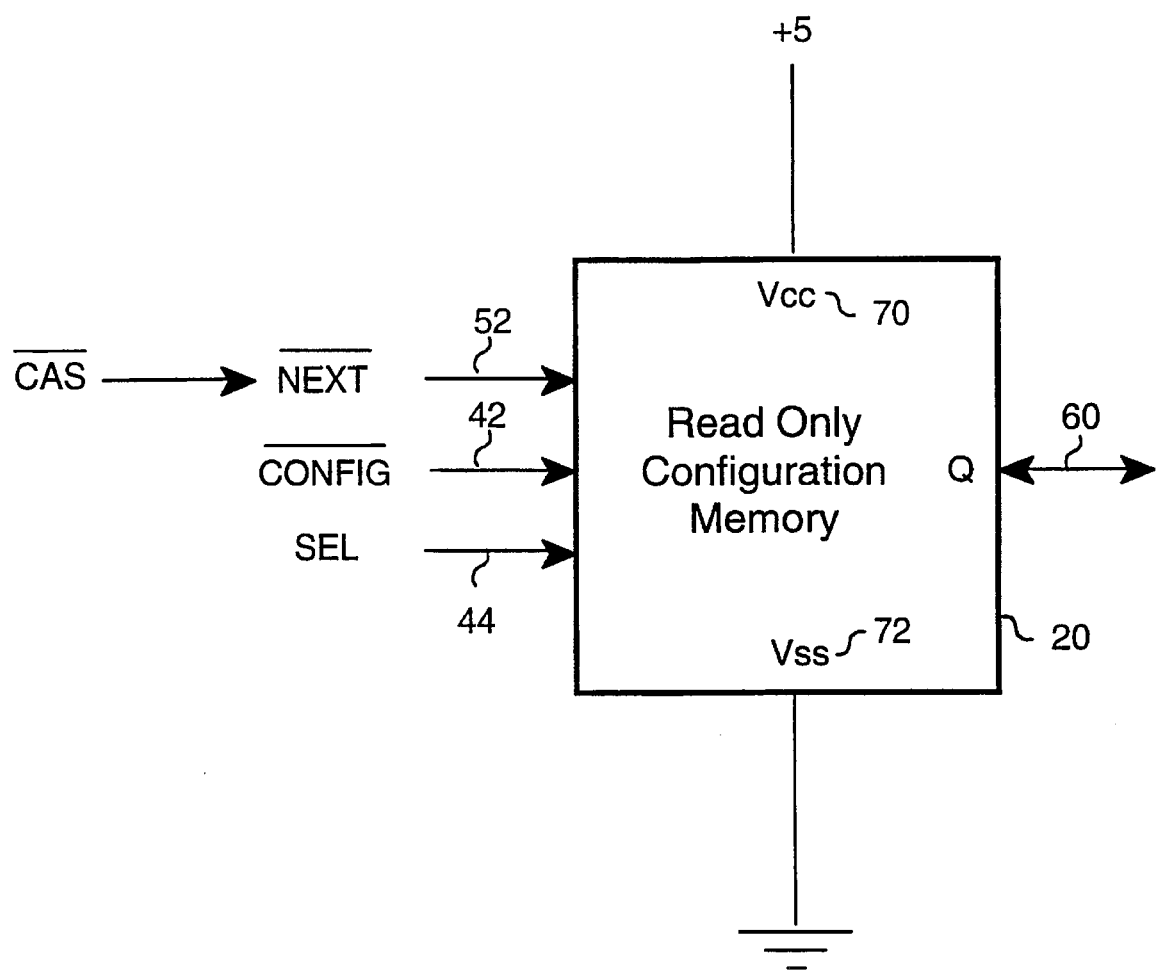
FIG. 4 is a block diagram depicting a read-only configuration memory.

FIG. 4 depicts the ROCM 20 in block diagram form. A voltage supply point $V_{cc}$ 70 is connected to approximately five volts DC. A low voltage point $V_{ss}$ 72 is connected to ground. The ROCM 20 is controlled by a $\overline{\text{NEXT}}$ signal on line 52 from a $\overline{\text{CAS}}$ signal, a $\overline{\text{CONFIG}}$ signal on line 42, and a SEL signal on the SEL line 44d, according to Table 2 shown below. In the memory module 12, the $\overline{\text{NEXT}}$ signal is the same as the $\overline{\text{CAS}}$ signal.

TABLE 2

| INPUTS | | | INTERNAL CURRENT STATES | | OUT-PUTS | INTERNAL NEXT STATES | |
|---|---|---|---|---|---|---|---|
| $\overline{\text{NEXT}}$ | SEL | $\overline{\text{CONFIG}}$ | STATE N | STATE E | Q | NEXT N | NEXT E |
| X | L | ↓ | X | X | Hi Z | — | L |
| H | H | ↓ | X | X | Hi Z | L | H |
| L | H | ↓ | X | X | $Q_0$ | L | H |
| ↑ | X | L | N | H | $Q_N$ | N + 1 | H |
| H | X | X | N | E | Hi Z | N | E |
| X | X | H | N | E | Hi Z | N | L |
| L | X | L | N | H | $Q_N$ | N | H |
| X | X | L | N | L | Hi Z | N | L |

Where:
the output at T state = the input at T + 1 state;
N = current place;
E = enabled;
H = high signal level;
L = low signal level;
↑ = transition from a low level signal to a high level signal; and
↓ = transition from a high level signal to a low signal level signal.

The signal line $\overline{CONFIG}$ connects to every module in the memory system. The signal line SEL connects to an address line. Each module connects to a different address line. The ROCM is selected by (1) asserting an address on the ADDR lines, which only assert SEL to a single module, (2) asserting $\overline{CAS}$, and (3) asserting $\overline{CONFIG}$. SEL is only sampled when $\overline{CONFIG}$ is asserted. When $\overline{CONFIG}$ is first asserted, the ROCM resets to its initial state. Thereafter, each time $\overline{NEXT}$ is asserted, Q is driven with the next bit in sequence. Q is always held in the high impedance state unless $\overline{CONFIG}$ and $\overline{NEXT}$ are both asserted and the module is selected by having SEL asserted when $\overline{CONFIG}$ was first asserted.

Figure 5A:
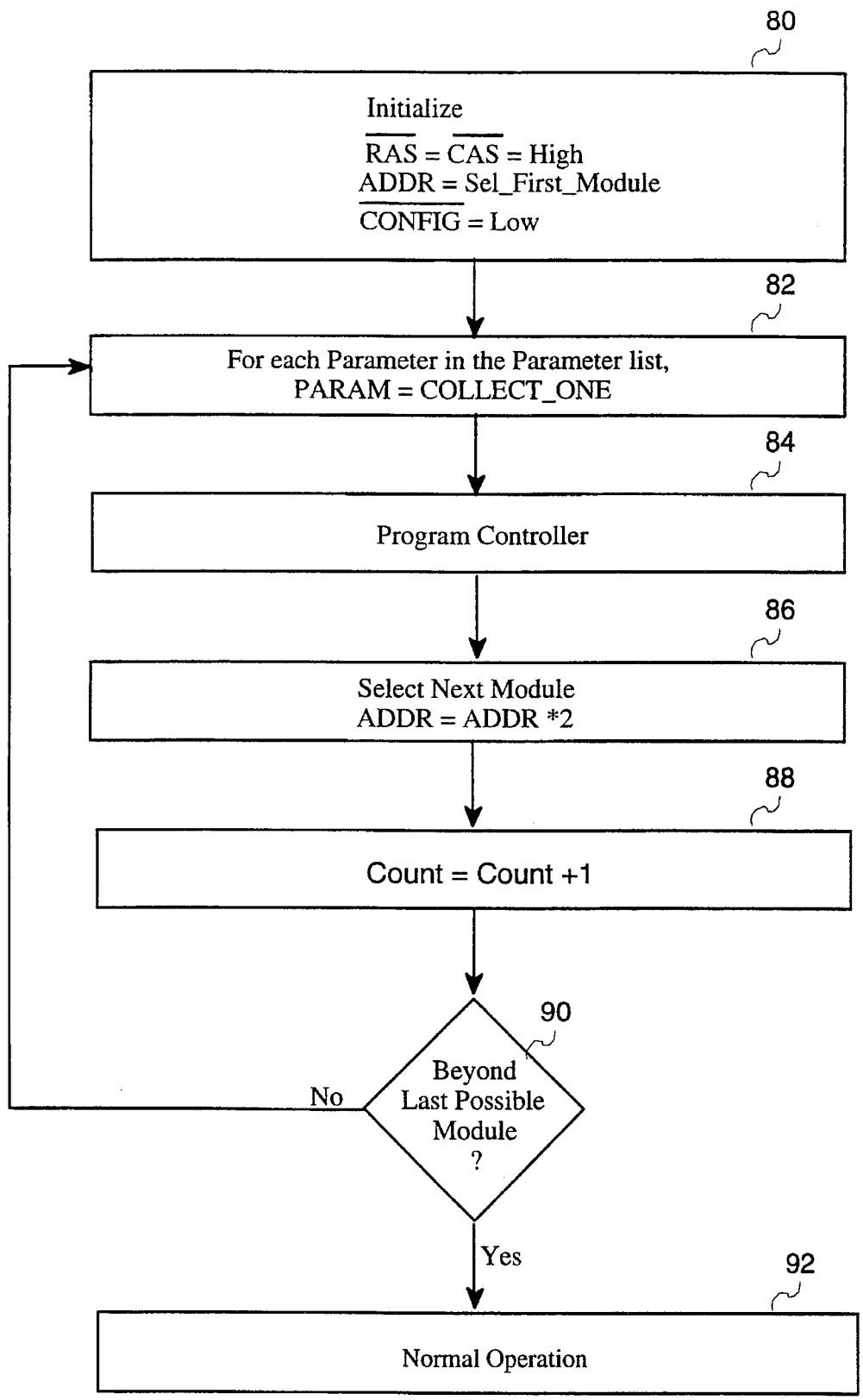
FIGS. 5a and 5b are flow charts showing the method of the memory module self-identification of the present invention.

Referring now to FIG. 5a, there is shown a flow chart depicting the process of the present invention, the self-identification of the configuration memory module. The process begins with an initialize step 80. Both $\overline{RAS}$ and $\overline{CAS}$ are initialized to high. The address is set to be an address that selects the first module, one with all zeros except for the lower order address bit equal to one. $\overline{CONFIG}$ is initialized to low. This sets the first module into a configuration mode. In step 82, for each parameter in the parameter list as stored in configuration RAM, the parameter is set to "Collect 1" which is a subroutine shown in FIG. 5b. In step 84, the memory controller (not shown in the figures) is programmed for the memory module, such as a SIMM, to respond to those parameters. In step 86, the address in the next module is selected by shifting the address left one position, which can also be done by multiplying the address by two. In step 88, a count of the modules COUNT is incremented. In step 90, a configuration controller (not shown) checks to see whether it is beyond the last possible memory configuration address, or memory SIMM position, for the system. If not, the configuration controller goes back for each parameter stage and collects parameters for the next module or SIMM. If the configuration controller has finished, it is ready to enter normal operation (step 92); it is finished with the configuration operation.

Figure 5B:
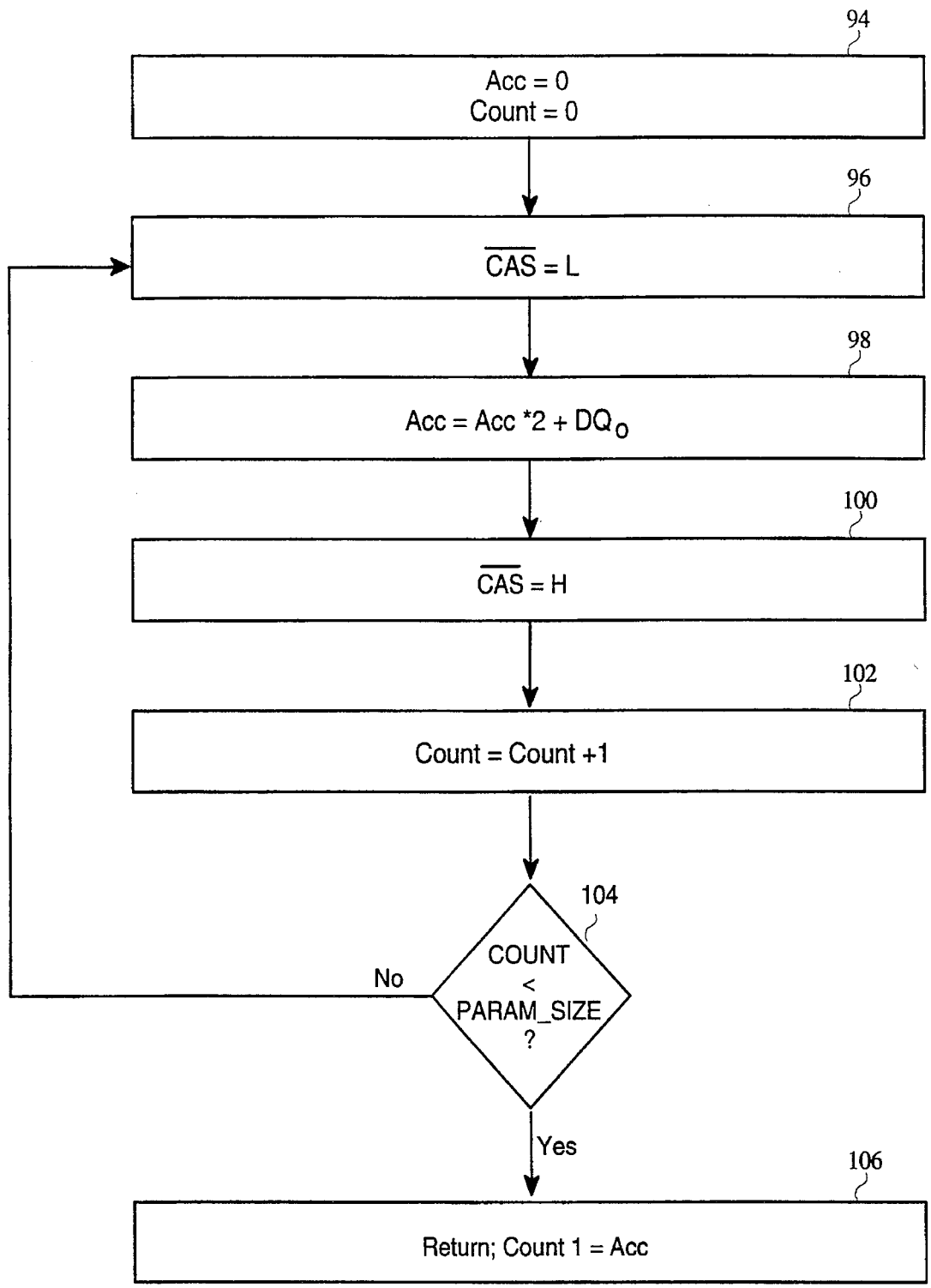

Referring now to FIG. 5b, the "Collect 1" flow chart, in step 94 the accumulator is set to zero, ($A_{cc}$=0), and an internal counter is set to zero. The counter counts the number of data bits that the configuration controller reads out of the configuration memory. In step 96, the configuration controller sets $\overline{CAS}$ equal to low. This selects the memory and causes the ROCM to drive out its first data. Step 98 is the accumulate step, which sets the value of "Collect 1". In step 98, the configuration controller takes the bit on $DQ_o$ and adds it into the previously accumulated bits, shifted up by multiplying the previously accumulated bits by two. (Accumulator ×2+$DQ_o$). Thus, the configuration controller shifts the accumulator and adds in a lower order bit, taken from the memory module's configuration memory. In step 100, the configuration controller returns $\overline{CAS}$ to high. This causes the ROCM memory to increment to the next location. In step 102, the configuration controller sets Count=Count+1 in order to keep track of how many data bits have been taken in from the ROCM. In step 104, the configuration controller tests whether the count is less than the parameter size. If the count is less than the parameter size then the configuration controller goes back to step 96, sets CAS =1, to accumulate more of the data bits. If the Count is greater than or equal to the parameter size, then the configuration controller has collected enough bits, and thus it returns, in step 106, the contents of $A_{cc}$ as the value of "Collect 1" to step 82 of FIG. 5A.

The fields in the ROM's 20, 22, and 24 are allocated to key parameters as shown below in Table 3. The full names of the key parameters are shown in Table 4. Other key parameters which could be included are shown on page 6-5 in "MOS Memory Data Book", #SMYD091, published in 1991 by Texas Instruments.

TABLE 3

| CODE | DESCRIPTION | SPACE IN MEMORY |
|---|---|---|
| Manufacturer: | JDEC Code | 8 bits |
| Part Number: | ASCII128 bits | (16 bytes) |
| Depth: | binary value to the base log2 of the number of words in the memory | 8 bits |
| Tarf: | Nanoseconds in binary | 8 bits |
| Tarp: | Nanoseconds in binary | 8 bits |
| Tdrf-rf: | Nanoseconds in binary | 8 bits |
| Tdrf-rp: | Nanoseconds in binary | 8 bits |
| Tdrp-rp: | Nanoseconds in binary | 8 bits |
| Tdrf-wf: | Nanoseconds in binary | 8 bits |
| Tdrp-wf: | Nanoseconds in binary | 8 bits |
| Tdrp-wp: | Nanoseconds in binary | 8 bits |
| Tdrf-wp: | Nanoseconds in binary | 8 bits |
| Tddwf: | Nanoseconds in binary | 8 bits |
| Tddwp: | Nanoseconds in binary | 8 bits |
| Tdwf-rf: | Nanoseconds in binary | 8 bits |
| Tdwf-rp: | Nanoseconds in binary | 8 bits |
| Tdwp-rf: | Nanoseconds in binary | 8 bits |
| Tdwp-rp: | Nanoseconds in binary | 8 bits |

TABLE 3

TABLE 4

| ABBREVIATION: | MEANING: |
|---|---|
| Tarf: | Time access read full |
| Tarp: | Time access read page |
| Tdrf-rf: | Time delay read full to read full |
| Tdrf-rp: | Time delay read full to read page |
| Tdrp-rp: | Time delay read page to read page |
| Tdrf-wf: | Time delay read full to write full |
| Tdrp-wf: | Time delay read page to write full |
| Tdrp-wp: | Time delay read page to write page |
| Tdrf-wp: | Time delay read full to write page |
| Tddwf: | Time delay data write full |
| Tddwp: | Time delay data write page |
| Tdwf-rf: | Time delay write full to read full |
| Tdwf-rp: | Time delay write full to read page |
| Tdwp-rf: | Time delay write page to read full |
| Tdwp-rp: | Time delay write page to read page |

In order to keep connections to a minimum, most of the control lines and all the data lines needed are shared with signals normally present on the memory module. For example, shown below in Table 4 are the signal lines which are used for two different signals.

TABLE 5

| Signal Line | Description | Signal Shared With |
|---|---|---|
| $\overline{\text{CONFIG}}$ | configuration ROM enable | none |
| Q | 1 bit data line | DQO |
| SEL | select this module | none |
| $\overline{\text{NEXT}}$ | step to next serial bit | $\overline{\text{CAS}}$ |

This scheme requires only $\overline{\text{CONFIG}}$ and SEL as additional connections to the module.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. A computer comprising:
   a. a processor for processing data, said processor having an address bus for generating addresses, a data bus having a plurality of bit lines for transferring data, said processor generating a module select signal SEL, an inverse column address strobe signal $\overline{\text{CAS}}$ and an inverse configuration signal $\overline{\text{CONFIG}}$;
   b. at least one memory module for storing the data; each memory module connected to said address bus and said data bus and receiving said module select signal SEL, said inverse column address strobe signal and said inverse configuration signal from said processor; each memory module comprising a read-write memory having a predetermined memory depth and a configuration memory, wherein the configuration memory:
      (i) contains memory module characteristic information;
      (ii) is adapted for storing a sequence of binary data values;
      (iii) has a $\overline{\text{NEXT}}$ signal pin;
      (iv) includes a data pointer pointing to one of said sequence of binary data values, said data pointer set to a first binary data value of said sequence of binary data values upon simultaneous receipt of said module select signal SEL and an inverse configuration signal $\overline{\text{CONFIG}}$, said data pointer set to a next binary data value of said sequence of binary data values when said inverse column address strobe signal $\overline{\text{CAS}}$ is no longer received on said $\overline{\text{NEXT}}$ signal pin; and
      (v) supplies a single bit of the stored sequence of binary data values pointed to by said data pointer upon each receipt of said inverse column address strobe signal $\overline{\text{CAS}}$ on said $\overline{\text{NEXT}}$ signal pin; wherein the configuration memory is adapted for receiving at the $\overline{\text{NEXT}}$ signal pin, and responding to, a $\overline{\text{CAS}}$ signal used by standard DRAMs.

2. The computer of claim 1, wherein the memory module characteristic information includes an identification code for a manufacturer of said memory module.

3. The computer of claim 2, wherein the memory module characteristic information includes a part number for said memory module.

4. The computer of claim 3, wherein the memory module characteristic information includes said predetermined memory depth of said read-write memory.

5. The computer of claim 4, wherein the memory module characteristic information includes access to times to read full and to read in page mode.

6. The computer of claim 5, wherein the memory module characteristic information includes delay times to read and write full, and to read and write in page mode.

7. In a computer having a processor for processing data, said processor having an address bus for generating addresses, a data bus having a plurality of bit lines for transferring data, said processor generating a module select signal SEL, an inverse column address strobe signal $\overline{\text{CAS}}$ and an inverse configuration signal $\overline{\text{CONFIG}}$, and at least one memory module for storing the data; each memory module comprising a read-write memory having a predetermined memory depth and a configuration memory, wherein the configuration memory:
   (i) contains memory module characteristic information;
   (ii) is adapted for storing a sequence of binary data values;
   (iii) has a $\overline{\text{NEXT}}$ signal pin;
   (iv) includes a data monitor pointing to one of said sequence of binary data values, said data pointer set to a first binary data value of said sequence of binary data values upon simultaneous receipt of said module select signal SEL and an inverse configuration signal $\overline{\text{CONFIG}}$, said data pointer set to a next binary data value of said sequence of binary data values when said inverse column address strobe signal $\overline{\text{CAS}}$ is no longer received on said $\overline{\text{NEXT}}$ signal pin; and
   (v) supplies a single bit of the stored sequence of binary data values pointed to by said data pointer upon each receipt of said inverse column address strobe signal $\overline{\text{CAS}}$ on said $\overline{\text{NEXT}}$ signal pin;
wherein the configuration memory is adapted for receiving at the $\overline{\text{NEXT}}$ signal pin, and responding to, a $\overline{\text{CAS}}$ signal used by standard DRAMs.

8. The memory module of claim 7, wherein said memory module characteristic information includes an identification code for a manufacturer of said memory module.

9. The memory module of claim 8, wherein said memory module characteristic information includes a part number for said memory module.

10. The memory module of claim 9, wherein said memory module characteristic information includes said predetermined memory depth of said read-write memory.

11. The memory module of claim 10, wherein said memory module characteristic information includes access to times to read full and to read in page mode.

12. The memory module of claim 11, wherein said memory module characteristic information includes delay times to read and write full, and to read and write in page mode.

13. A computer comprising:
   a. a processor for processing data, said processor having an address bus for generating addresses, a data bus having a plurality of bit lines for transferring data, said processor generating a module select signal SEL, an inverse column address strobe signal $\overline{\text{CAS}}$ and an inverse configuration signal $\overline{\text{CONFIG}}$;
   b. at least one memory module for storing the data; each memory module connected to said address bus and said data bus and receiving said module select signal SEL, said inverse column address strobe signal $\overline{\text{CAS}}$ and said inverse configuration signal $\overline{\text{CONFIG}}$ from said processor; each memory module comprising a read-write memory having a predetermined plural number of bits per addressable memory location and a configuration memory, wherein the configuration memory:

(i) contains memory module characteristic information;
(ii) has a $\overline{\text{NEXT}}$ signal pin receiving said inverse column address strobe signal $\overline{\text{CAS}}$ generated by said processor; and
(iii) is adapted for storing a sequence of binary data values;
(iv) includes a data pointer pointing to one of said sequence of binary data values, said data pointer set to a first binary data value of said sequence of binary data values upon simultaneous receipt of said module select signal SEL and an inverse configuration signal $\overline{\text{CONFIG}}$, said data pointer set to a next binary data value of said sequence of binary data values when said inverse column address strobe signal $\overline{\text{CAS}}$ is no longer received on said $\overline{\text{NEXT}}$ signal pin; and
(v) supplies a single bit of the stored sequence of binary data values pointed to by said data pointer to a predetermined one of said plurality of bit lines of said data bus upon each receipt of said inverse column address strobe signal $\overline{\text{CAS}}$ on said $\overline{\text{NEXT}}$ signal pin.

14. The computer of claim 13, wherein the memory module characteristic information includes an identification code for a manufacturer of said memory module.

15. The computer of claim 14, wherein the memory module characteristic information includes a part number for said memory module.

16. The computer of claim 15, wherein the memory module characteristic information includes said predetermined number of bits per addressable memory location of said read-write memory.

17. The computer of claim 16, wherein the memory module characteristic information includes access to times to read full and to read in page mode.

18. The computer of claim 17, wherein the memory module characteristic information includes delay times to read and write full, and to read and write in page mode.

19. In a computer having a processor for processing data, said processor having an address bus for generating addresses, a data bus having a plurality of bit lines for transferring data, said processor generating a module select signal SEL, an inverse column address strobe signal $\overline{\text{CAS}}$ and an inverse configuration signal $\overline{\text{CONFIG}}$, and at least one memory module for storing the data; each memory module comprising a read-write memory having a predetermined plural number of bits per addressable memory location and a configuration memory, wherein the configuration memory:

(i) contains memory module characteristic information;
(ii) has a $\overline{\text{NEXT}}$ signal pin receiving said inverse column address strobe signal $\overline{\text{CAS}}$ generated by said processor; and
(iii) is adapted for storing a sequence of binary data values;
(iv) includes a data pointer pointing to one of said sequence of binary data values, said data pointer set to a first binary data value of said sequence of binary data values upon simultaneous receipt of said module select signal SEL and an inverse configuration signal $\overline{\text{CONFIG}}$, said data pointer set to a next binary data value of said sequence of binary data values when said inverse column address strobe signal $\overline{\text{CAS}}$ is no longer received on said $\overline{\text{NEXT}}$ signal pin; and (v) supplies a single bit of the stored sequence of binary data values pointed to by said data pointer to a predetermined one of said plurality of bit lines of said data bus upon each receipt of said inverse column address strobe signal $\overline{\text{CAS}}$ on said $\overline{\text{NEXT}}$ signal pin.

20. The memory module of claim 19, wherein said memory module characteristic information includes an identification code for a manufacturer of said memory module.

21. The memory module of claim 20, wherein said memory module characteristic information includes a part number for said memory module.

22. The memory module of claim 21, wherein said memory module characteristic information includes said predetermined number of bits per addressable memory location of said read-write memory.

23. The memory module of claim 22, wherein said memory module characteristic information includes access to times to read full and to read in page mode.

24. The memory module of claim 23, wherein said memory module characteristic information includes delay times to read and write full, and to read and write in page mode.

25. A memory module comprising:
a. at least one read/write memory having a plurality of addressable storage locations, each read/write memory including an address port for receiving a multibit address, a data port for transferring multibit data into or out of said read/write memory, a row address strobe input, a column address strobe input and a write enable input;
b. a read only configuration memory storing memory module characteristic information, said read only configuration memory having a NEXT input connected to receive said column address strobe input, a module select input connected to a predetermined bit of said multibit address, a configuration input and a data output connected to a predetermined bit of said multibit data port, said read only configuration memory
pointing to a first bit of said module characteristic information upon simultaneous receipt of a module select signal and a configuration signal on said configuration input,
pointing to a next bit of said module characteristic information when no longer receiving a column address strobe signal on said NEXT signal input, and
supplying a pointed to bit of said module characteristic information to a predetermined bit of said data port upon each receipt of said column address strobe signal on said NEXT input.

26. The memory module of claim 25, wherein the memory module characteristic information includes an identification code for a manufacturer of said memory module.

27. The memory module of claim 26, wherein the memory module characteristic information includes a part number for said memory module.

28. The memory module of claim 27, wherein the memory module characteristic information includes a number of bits of said data port of said read-write memory.

29. The memory module of claim 28, wherein the memory module characteristic information includes access to times to read full and to read in page mode.

30. The memory module of claim 29, wherein the memory module characteristic information includes delay times to read and write full, and to read and write in page mode.

* * * * *